(12) United States Patent
Bahnasy et al.

(10) Patent No.: US 11,863,451 B2
(45) Date of Patent: Jan. 2, 2024

(54) HARDWARE ACCELERATED TEMPORAL CONGESTION SIGNALS

(71) Applicant: HUAWEI TECHNOLOGIES CO., LTD., Shenzhen (CN)

(72) Inventors: Mahmoud Mohamed Bahnasy, Waterloo (CA); Ali Munir, Kitchener (CA); Ron Thomas, Toronto (CA); Si Yan, Waterloo (CA); Yashar Ganjali, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/744,886

(22) Filed: May 16, 2022

(65) Prior Publication Data

US 2023/0370381 A1 Nov. 16, 2023

(51) Int. Cl.
*H04L 43/106* (2022.01)
*H04L 47/122* (2022.01)
*H04L 47/127* (2022.01)
*H04L 43/16* (2022.01)
*H04L 43/0882* (2022.01)

(52) U.S. Cl.
CPC ........ *H04L 47/122* (2013.01); *H04L 43/0882* (2013.01); *H04L 43/106* (2013.01); *H04L 43/16* (2013.01); *H04L 47/127* (2013.01)

(58) Field of Classification Search
None
See application file for complete search history.

(56) References Cited

U.S. PATENT DOCUMENTS

| | | | |
|---|---|---|---|
| 11,206,579 | B1 | 12/2021 | Ward, Jr. et al. |
| 2006/0168272 | A1 | 7/2006 | Rustad et al. |
| 2007/0133418 | A1 | 6/2007 | Agarwal |
| 2015/0019716 | A1 | 1/2015 | Kim et al. |
| 2015/0381541 | A1* | 12/2015 | Zhang ............... H04L 51/226 709/206 |
| 2016/0226703 | A1* | 8/2016 | Grinshpun ......... H04L 41/0803 |

(Continued)

FOREIGN PATENT DOCUMENTS

| | | |
|---|---|---|
| CN | 108512774 A | 9/2018 |
| CN | 111034254 A | 4/2020 |
| CN | 2019106312866 | 4/2020 |

OTHER PUBLICATIONS

Li, Yuliang et al., HPCC: High Precision Congestion Control, Alibaba Group, Harvard University, University of Cambridge, Massachusetts Institute of Technology, SIGCOMM, Aug. 19-23, 2019, total 15 pages.

(Continued)

*Primary Examiner* — Joshua Joo

(57) ABSTRACT

There is provided a method and apparatus to generate temporal congestion signals. The method is used by a device and includes receiving a packet which includes a request for network state information and generating one or more temporal congestion signals. The method also including adding the temporal congestion signals to the packet and transmitting the packet including the temporal congestion signals. The temporal congestion signals can include one or more of a line busyness signal, which measures the duration of a busy period of the device, and a line idleness signal, which measures the duration of an idle period of the device.

18 Claims, 8 Drawing Sheets

(56) References Cited

U.S. PATENT DOCUMENTS

| | | | |
|---|---|---|---|
| 2020/0084155 A1* | 3/2020 | Song | H04L 47/193 |
| 2020/0119988 A1* | 4/2020 | Castellanos | H04L 41/5054 |
| 2020/0322216 A1* | 10/2020 | Singla | H04L 67/02 |
| 2021/0112002 A1* | 4/2021 | Pan | G06F 15/17331 |
| 2021/0203578 A1 | 7/2021 | Li et al. | |
| 2022/0014478 A1* | 1/2022 | Lee | H04L 47/781 |
| 2022/0046466 A1* | 2/2022 | Sridhar | H04W 28/02 |
| 2022/0060422 A1* | 2/2022 | Sommers | H04L 47/2466 |
| 2022/0209861 A1 | 6/2022 | Baer et al. | |
| 2022/0239571 A1* | 7/2022 | Rangarajan | H04L 43/062 |
| 2022/0255820 A1* | 8/2022 | Biradar | H04L 43/062 |
| 2022/0417323 A1* | 12/2022 | Julien | H04L 67/288 |

OTHER PUBLICATIONS

Brockners, F., Ed. et al., Data Fields for In-situ OAM, draft-ietf-ippm-ioam-data-12, Feb. 21, 2021, total 52 pages.

Alibaba et al., In-band Network Telemetry (INT) Dataplane Specification, Version 2.1, Nov. 11, 2020, https://p4.org/p4-spec/docs/INT_v2_1.pdf, total 56 pages.

Zhu, Yibo, et al. "ECN or Delay: Lessons Learnt from Analysis of DCQCN and TIMELY." Proceedings of the 12th International on Conference on emerging Networking Experiments and Technologies, Dec. 6, 2016, total 15 pages.

Kumar, Gautam, et al. "Swift: Delay is simple and effective for congestion control in the datacenter." Proceedings of the Annual conference of the ACM Special Interest Group on Data Communication on the applications, technologies, architectures, and protocols for computer communication, Jul. 30, 2020, total 15 pages.

Cisco Systems, Inc., In-band OAM for IPv6, https://www.cisco.com/c/en/us/td/docs/ios-xml/ios/ipv6_nman/configuration/15-mt/ip6n-15-mt-book.html, Nov. 21, 2012, total 36 pages.

Samsung, Overview of flow control solutions, 3GPP TSG-RAN WG3 Meeting #103, R3-190435, Athens, Greece, Feb. 25-Mar. 1, 2019, 5 pages.

Tan, Lizhuang, et al. "In-band network telemetry: A survey." Computer Networks 186 (2021): 107763.

N. Parvez, A. Mahanti and C. Williamson, "TCP NewReno: Slow-but-Steady or Impatient?," 2006 IEEE International Conference on Communications, 2006, pp. 716-722, doi: 10.1109/ICC.2006.254792.

Alizadeh, Mohammad, et al. "Data center TCP (DCTCP)", Proceedings of the ACM SIGCOMM 2010 Conference, 2010.

Hu et al., "Aeolus: A Building Block for Proactive Transport in Datacenters", SIGCOMM 2020, Aug. 10-14, 2020.

RFC: 793, Transmission Control Protocol, Darpa Internet Program, Protocol Specification, Sep. 1981, prepared for Defense Advanced Research Projects Agency, by Information Sciences Institute, University of Southern California, 4676 Admiralty Way, Marina del Rey, California 90291.

Cardwell et al., "Measuring bottleneck bandwidth and round-trip propagation time", BBR: Congestion-Based Congestion Control, Sep.-Oct. 2016, Acmqueue, pp. 1-34.

Digital Systems and Networks, Packet over Transport aspects—Ethernet over Transport aspects, Internet protocol aspects—Operation, administration and maintenance, OAM functions and mechanisms for Ethernet based networks, 2013.

* cited by examiner

HARDWARE ACCELERATED TEMPORAL CONGESTION SIGNALS

CROSS-REFERENCE TO RELATED APPLICATIONS

This is the first application filed for the present disclosure.

FIELD

The present disclosure relates to the field of communication networks, and particularly to a system and method to provide temporal congestion signals which provide information about network state.

BACKGROUND

Congestion control (CC) systems may seek to control the amount of traffic entering a network to avoid congestion. However, existing CC algorithms use coarse-grained feedback signals which can provide late or inaccurate indications of network congestion. For example, these algorithms can rely on packet losses, which may provide a late indication of congestion and that indication may be inaccurate if packets are dropped for reasons other than congestion. Other CC algorithms, such as explicit congestion notification (ECN), may use a queue length of a device, but this signal may be noisy.

One potential improvement has been proposed in U.S. patent application Ser. No. 17/488,893, filed on Sep. 29, 2021, entitled, "Methods, Systems and Devices for Network Management Using Control Packets," which is hereby incorporated by reference in its entirety. This improvement includes a scout-service which introduces temporal congestion signals, such as busyness, to provide early information about congestion state and bandwidth availability. These temporal congestion signals provide early information about network congestion and bandwidth availability, offering improved performance over prior CC mechanisms. However, this approach requires hosts to generate scout packets, and require priority queues at the switches. These scout packets may induce overhead on the network. Therefore, there is a need for a system and method which can provide timely, accurate indications of network congestion without the added overhead of the prior art.

This background information is provided to reveal information believed by the applicant to be of possible relevance to the present disclosure. No admission is necessarily intended, nor should be construed, that any of the preceding information constitutes prior art against the present invention.

SUMMARY

The present disclosure provides methods and apparatus related to network devices which are configured to generate temporal congestion signals which provide information about network state and active flow status. These methods may be used by switches, including programmable switches, and may include line busyness and line idleness signals. Both of these temporal congestion signals may represent the state of a link in the time domain, and may provide early and amplified indications of congestion compared to spatial congestion signals such as queue length or queuing delay. The present disclosure also includes methods of using these temporal congestion signals to adjust flow rates to seek efficient utilization of available bandwidth.

In one aspect, a method is disclosed which includes a device receiving a packet including a request for network state information and generating one or more temporal congestion signals. The method also includes the device adding the one or more temporal congestion signals to the packet and transmitting the packet including the one or more temporal congestion signals. The request for network state information may be an in-band network telemetry (INT) header on the packet. Generating one or more temporal congestion signals may include generating at least a line busyness signal based on a duration of a busy period of the device. Generating at least a line busyness signal based on a duration of a busy period of the device may include, if the device has one or more items in its queue, generating a line busyness signal based on a difference between an arrival time of the packet and a start time of the busy period of the device, and, if the device has no items in its queue, generating a line busyness signal based on a difference between a start time of an idle period of the device and a start time of the busy period of the device.

Generating one or more temporal congestion signals may include generating at least a line idleness signal based on a duration of an idle period of the device. Generating at least a line idleness signal based on a duration of an idle period of the device may include, if the device has one or more items in its queue, generating a line idleness signal based on a difference between a start time of a busy period of the device and a start time of the idle period of the device and, if the device has no items in its queue, generating a line idleness signal based on a difference between an arrival time of the packet and a start time of the idle period of the device. The one or more temporal congestion signals may include information sufficient to calculate one or more of a line busyness signal and a line idleness signal. The information sufficient to calculate one or more of a line busyness signal and a line idleness signal may include a queue length, an egress time stamp, an idle start time, and a busy start time. Adding the one or more temporal congestion signals to the packet may include adding the one or more temporal congestion signals to the packet to an in-band network telemetry (INT) header on the packet. The device using this method may be a switch.

In one aspect, a method is disclosed. The method includes a device marking a first packet to include a request for network state information, transmitting the marked first packet, and receiving a second packet including one or more temporal congestion signals. The method can further include the device adjusting a control flow rate based at least in part on the one or more temporal congestion signals included in the second packet. Adjusting a control flow rate can include adjusting a congestion window size based at least in part on the one or more temporal congestion signals included in the second packet. The one or more temporal congestion signals can include a line busyness signal, and adjusting a congestion window size based at least in part on the one or more temporal congestion signals included in the second packet can include calculating a decrease factor based on the line busyness signal and a minimum line busyness signal and adjusting the congestion window size based on the decrease factor. The request for network state information may be an in-band network telemetry (INT) header on the first packet. The second packet may be an acknowledgement (ACK). The second packet may include the one or more temporal congestion signals in an in-band network telemetry (INT) header on the second packet. The one or more temporal congestion signals may include one or more of a line busyness signal and a line idleness signal. The one or more temporal congestion signals may include information sufficient to calculate a line busyness signal and a line idleness signal. The information sufficient to calculate a line busyness signal and a line idleness signal may include a queue length, an egress time stamp, an idle start time, and a busy start time. The method may further include calculating a line busyness signal and a line idleness signal based on the queue length, the egress time stamp, the idle start time, and the busy start time.

The present disclosure describes an apparatus which includes at least one processor and at least one machine-readable medium storing executable instructions which, when executed by the at least one processor, configure the apparatus to receive a packet including a request for network state information and generate one or more temporal congestion signals. The instructions further the configured the apparatus to add the one or more temporal congestion signals to the packet and transmit the packet including the one or more temporal congestion signals. Generating one or more temporal congestion signals may include generating a line busyness signal based on a duration of a busy period of the apparatus and generating a line idleness signal based on a duration of an idle period of the apparatus.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Congestion control (CC) algorithms may provide feedback on the congestion of a network. However, this feedback may be coarse-grained and provide late and/or inaccurate indications of network congestion. Instead, temporal congestion signals such as line idleness and line busyness may be used to provide early information about network congestion and bandwidth availability. Temporal congestion signals may transmit data related to the temporal or time domain, such as the amount of time during which a device was idle or busy. These temporal congestion signals may be transmitted by switches, such as when they receive a request from a host. Switches may transmit these signals prior to reaching maximum link utilization, which may enable hosts to adjust their traffic rates prior to congestion delays and/or dropped packets.

Rather than using scout packets which may increase network overhead, switches may be configured to calculate temporal congestion signals. These switches may calculate these values directly and include them in a packet, such as using an in-band network telemetry (INT) header in a packet. Alternatively, a switch may include information sufficient to calculate the temporal congestion signals and include this information in the packet, allowing a host to calculate line busyness and line idleness. These values may then be returned to the host, such as in an acknowledgement (ACK) packet received from a destination node of the packet.

A host may be configured to request temporal congestion signals from the switch and may be configured to react to the signals it receives. A host may periodically request temporal congestion signals from a switch, such as by marking packets to include this request. For example, a host may include an INT header in a packet to indicate a request for temporal congestion signals. The host may use the line busyness and line idleness signals to adjust its flow rate, such as its congestion window size, based on the received temporal congestion signals. These temporal congestion signals may allow a host to react more rapidly to network congestion than prior CC algorithms, while causing less overhead than prior approaches which used separate scout packets.

Figure 1:
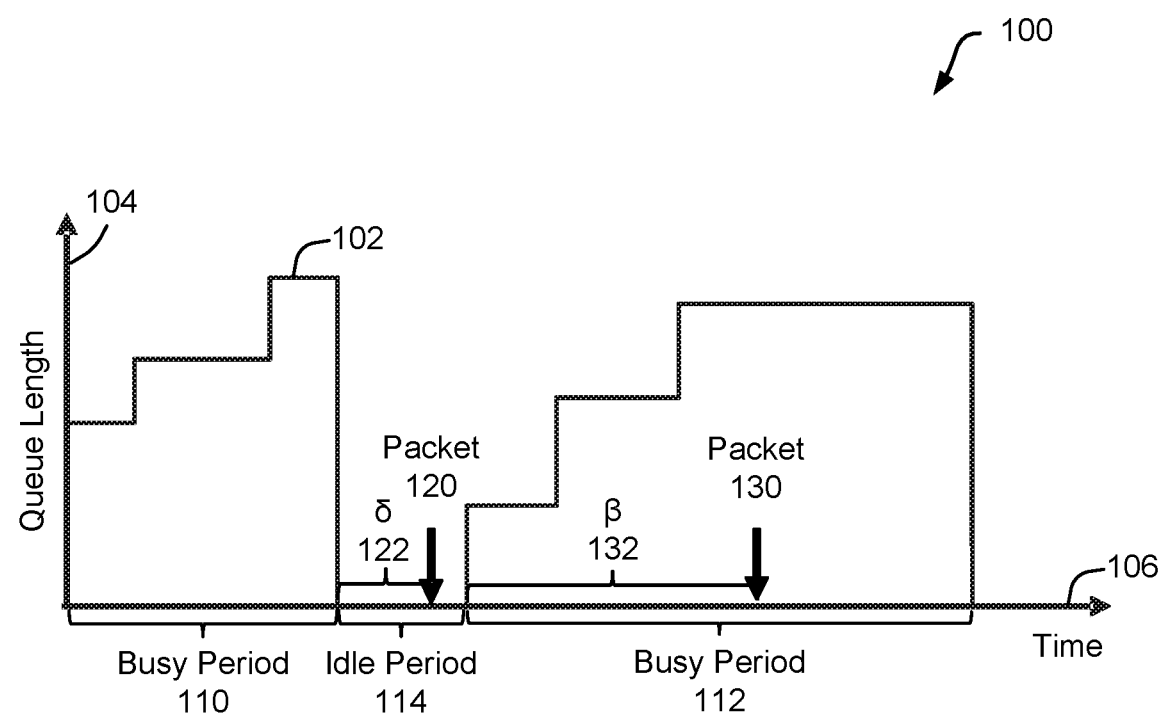
FIG. 1 is an illustration of the line busyness and line idleness signals of a network device, according to some aspects of the present disclosure.

FIG. 1 is an illustration 100 of the line busyness and line idleness signals of a network device, according to one aspect of the present disclosure. The network device may be a switch, such as a programmable switch. The illustration graphs the queue length 102 of a network device, such as a switch, on the spatial domain or y-axis 104 and the time on the time domain or x-axis 106.

The queue length 102 of the device may vary in time, based on the traffic in the network. The device may have busy periods 110, 112, during which there it has a queue of packets waiting to be transmitted, and the device may also have idle periods 114, during which there is no queue.

The device may be configured to generate temporal congestion signals, such as when it receives a request for these signals. The device receives a packet 120 during an idle period 114 of the device when there are no packets in its queue. The device may be configured to generate a line idleness (δ) 122 signal, which reflects the amount of time the device was idle for prior to receiving the packet 120. In this example, the device was idle from the end of its previous busy period 110 until the receipt of the packet 120. The device may also be configured to generate a line busyness value, which may be the length of the busy period 110 which was immediately prior to its current idle period 122.

Subsequently, the device receives another packet 130 while the queue was busy, during busy period 112. The device may be configured to generate a line busyness (β) 132 signal, which reflects the amount of time the device has been busy for prior to receiving the packet 130. In this example, the device was busy from the end of its previous idle period 114 until the receipt of the packet 130. The device may also be configured to generate a line idleness signal, which may be the length of the idle period 114 which was immediately prior to its current busy period 132.

Generally, the queue length 102 of a device, or its queueing delay, is a spatial congestion signal which provides information about the queue state of the device in the spatial domain or the y-axis in illustration 100. These spatial congestion signals may provide a snapshot in time, showing information for the present moment. In contrast, line busyness 132 and line idleness 122 are temporal congestion signals which provide information about the queue state of the device in the time domain or the x-axis in illustration 100.

Temporal congestion signals may be tightly related to link utilization, and may provide early indications of congestion, such as when a device gets close to maximum link utilization, even before it accumulates packets in its queue. Temporal congestion signals may also have other useful properties, such as providing amplified congestion signals when compared to spatial congestion signals such as queue length or queueing delay, which is limited to the hardware buffer size. Temporal congestion signals may also not be limited by the buffer size of a device while spatial signals are. Temporal congestion signals may also be advantageous over other signals as they can provide instantaneous information about the bandwidth available at a switch, compared with other indicators such as link utilization which must be aggregated over a period of time.

Figure 2:
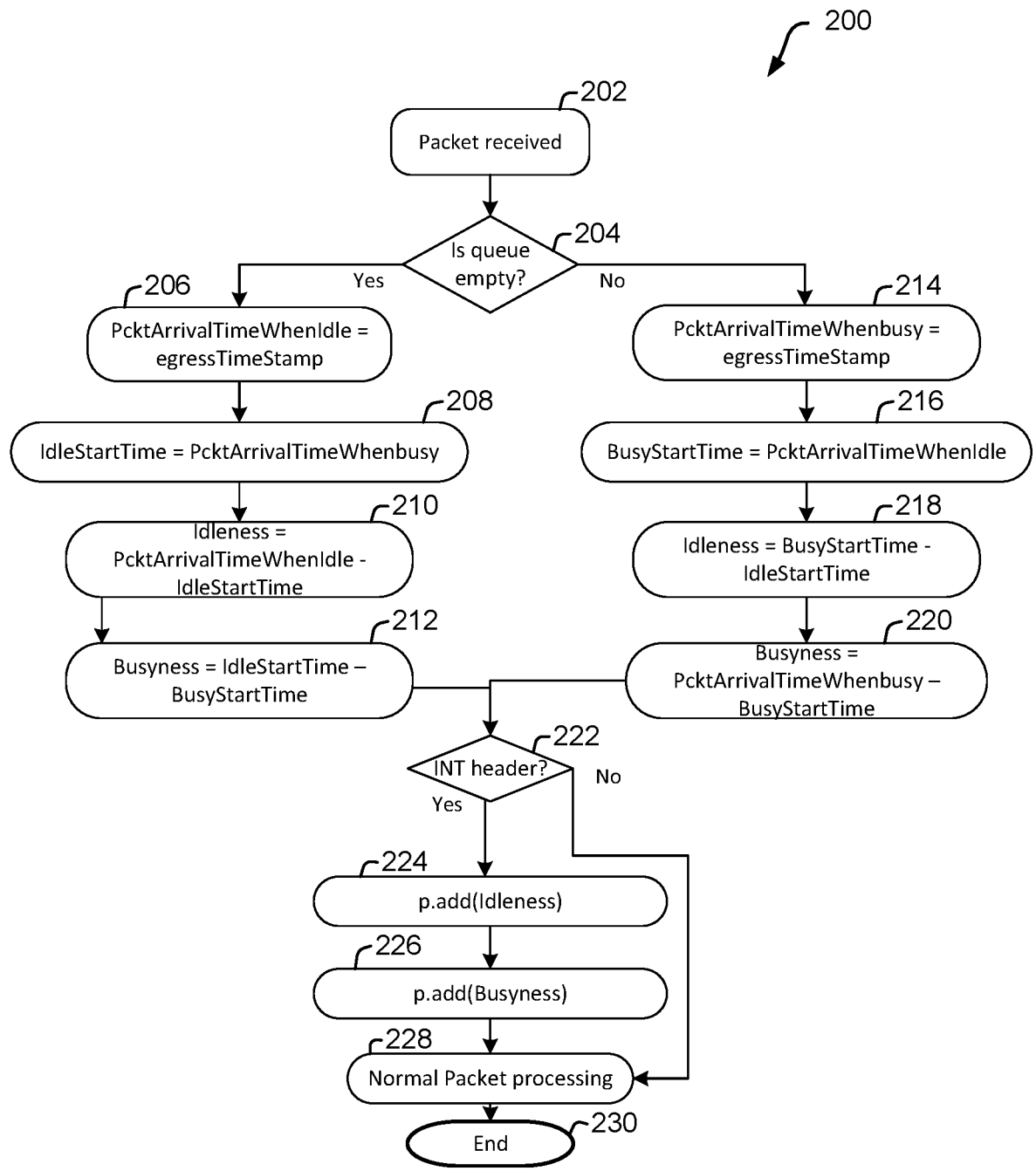
FIG. 2 is a method used by a device to calculate a line busyness and line idleness signal, according to one aspect of the present disclosure.

FIG. 2 is a method 200 used by a device to calculate a line busyness and line idleness signal, according to one aspect of the present disclosure. This method 200 may be used by a switch, including programmable switches and other switches. This method 200 allows a switch to calculate both line idleness and line busyness, and to include those values in the packet if the packet includes an INT header. The line idleness and line busyness values may be calculated in different ways depending on whether the switch is currently idle or busy. When a switch is idle, the line idleness value may be the length of the current idle period while the line busyness value is the length of the prior busy period. When a switch is busy, the line busyness value may be the length of the current busy period, while line idleness is the length of a prior idle period.

The method 200 may be configured to update certain values when new packets are received, so that it can accurately calculate idleness and busyness. For example, the switch may update packet arrival time when idle (PcktArrivalTimeWhenIdle), packet arrival time when busy (PcktArrivalTimeWhenbusy), idle start time (IdleStartTime), and busy start time (BusyStartTime) for each packet received, whether or not those packets include a request for temporal congestion signals. Each of these measurements may be based on time stamps which are local to the device, and therefore may not require synchronization between clocks of different devices.

At block 202, the switch receives a packet and at block 204, the switch checks whether its queue is empty. This check may be used to inform the switch of how to calculate its line busyness and line idleness values. If the queue is empty, the switch will proceed to block 206, while if the queue is not empty, the switch will proceed to block 214.

If the queue is empty, the switch proceeds to block 206, where it sets a packet arrival time when idle (PcktArrivalTimeWhenIdle) value to be equal to an egress time stamp (egressTimeStamp) on the packet. For example, the packet may include a time stamp which indicates when it was transmitted by a source node to the device. The egressTimeStamp may be intrinsic metadata which is created by the switch for each packet it receives, recording the time when the packet was received by the switch. Thus, the packet arrival time when idle value may be set to the time at which a source node transmitted the packet. The packet arrival time when idle value may be used by the device in a later instance of this method 200, at block 216, to show the start of a busy period.

At block 208, the switch sets a start time of an idle period of the device (IdleStartTime) value to be equal to a packet arrival time when busy (PcktArrivalTimeWhenBusy) value. The packet arrival time when busy value may be set each time the switch receives a packet while it is busy, such as at block 214. Accordingly, the idle start time value may reflect the most recent time when the switch received a packet while it was in a busy period, or the end of the most recent busy period.

At block 210, the switch generates a line idleness signal based on a direction of an idle period of the device, with the idleness value equal to the packet arrival time when idle value set in block 206 minus the IdleStartTime value set in block 208. That is, the idleness value, or line idleness, may be a duration of time between when the current packet arrived and the end of the most recent busy period.

At block 212, the switch generates a line busyness signal based on a direction of a busy period of the device, with the busyness value equal to the IdleStartTime value minus a BusyStartTime value. That is, the line busyness value reflects a duration of time between the end of the most recent busy period and the start of the most recent busy period, as set in block 216.

Each of these four blocks 206, 208, 210, 212 occur when the switch has an empty queue when the packet is received.

Alternatively, if the queue is not empty, the switch proceeds to block 214. At block 214, the switch determines a packet arrival time when busy (PcktArrivalTimeWhenBusy) value to be equal to an egress time stamp (egressTimeStamp) of the packet. This value may be used in a later iteration of this method 200 at block 208.

At block 216, the switch sets start time of a busy period of the device (BusyStartTime) value to be equal to a packet arrival time when idle (PcktArrivalTimeWhenIdle) value. That is, the busy start time value may be set to the time at which a packet last arrived when the switch was idle, which may have been set in a previous iteration of this method 200 at block 206.

At block 218, the switch generates a line idleness signal based on a direction of an idle period of the device, with the idleness value equal to the busy start time value set in block 216 minus start time of an idle period of the device (IdleStartTime) value. The idle start time value may have been set in a previous iteration of this method 200 at block 208. The line idleness may be a duration of time between the time when the most recent idle period ended (the busy start time) and the time when the most recent idle period began (the idle start time).

At block 220, the switch generates a line busyness signal based on a direction of a busy period of the device, with the busyness value equal to the packet arrival time when busy value set in block 214 value minus a BusyStartTime value. The line busyness value may be a duration of time between the time that the current packet arrived and the time when the current busy period began.

Next, the switch proceeds to block 222, whether or not the queue was empty in block 204. At block 222, the switch checks whether the packet contains an in-band network telemetry (INT) header. A host, or source node, may transmit a packet to a destination node. The host may include an INT header in the packet to request that it receive network congestion signals, such as the temporal congestion signals of this method 200. Other indications may also be used to request the inclusion of temporal congestion signals.

At block 224 and block 226, if the packet contains an INT header, the switch adds the line idleness and line busyness values to the packet header. These temporal congestion signals may then be passed along to the host by a destination node, such as in an INT header in an ACK message.

At block 228, the switch proceeds with normal packet processing before the process ends 230.

As described in method 200, line busyness and line idleness may be calculated based on somewhat different formulas, depending on whether a packet is received when the switch is idle or busy. If the queue is empty, line busyness is a duration calculated in block 212 based on $\beta$=idleStartTime−busyStartTime, and line idleness is a duration calculated in block 210 based on $\delta$=egressTimeStamp−idleStartTime. If the queue is not empty, such that there is one or more items in its queue, line busyness is a duration calculated in block 220 based on $\beta$=egressTimeStamp−busyStartTime, and line idleness is a duration calculated in block 218 based on $\delta$=busyStartTime−idleStartTime. In either case, these formulas may calculate busyness to be the length of the most recent or current busy period, and idleness to be the length of the most recent or current idle period.

In method 200, the switch includes both idleness and busyness in the packet. Alternatively, the switch may include only one of these values in the packet or may selectively include these values in the packet based on their value. For example, a switch may receive a packet which already includes busyness and idleness signals from another node, and the switch may selectively overwrite one or both of those values if, e.g., its line busyness value is higher than the value in the packet or its line idleness value is smaller than the value in the packet. This may allow a host to receive the maximum line busyness value between multiple nodes on a link, and to receive the minimum line idleness between multiple nodes on the link. This may allow a host to adjust its congestion window sizing based on the most overloaded node on a data path.

Figure 3:
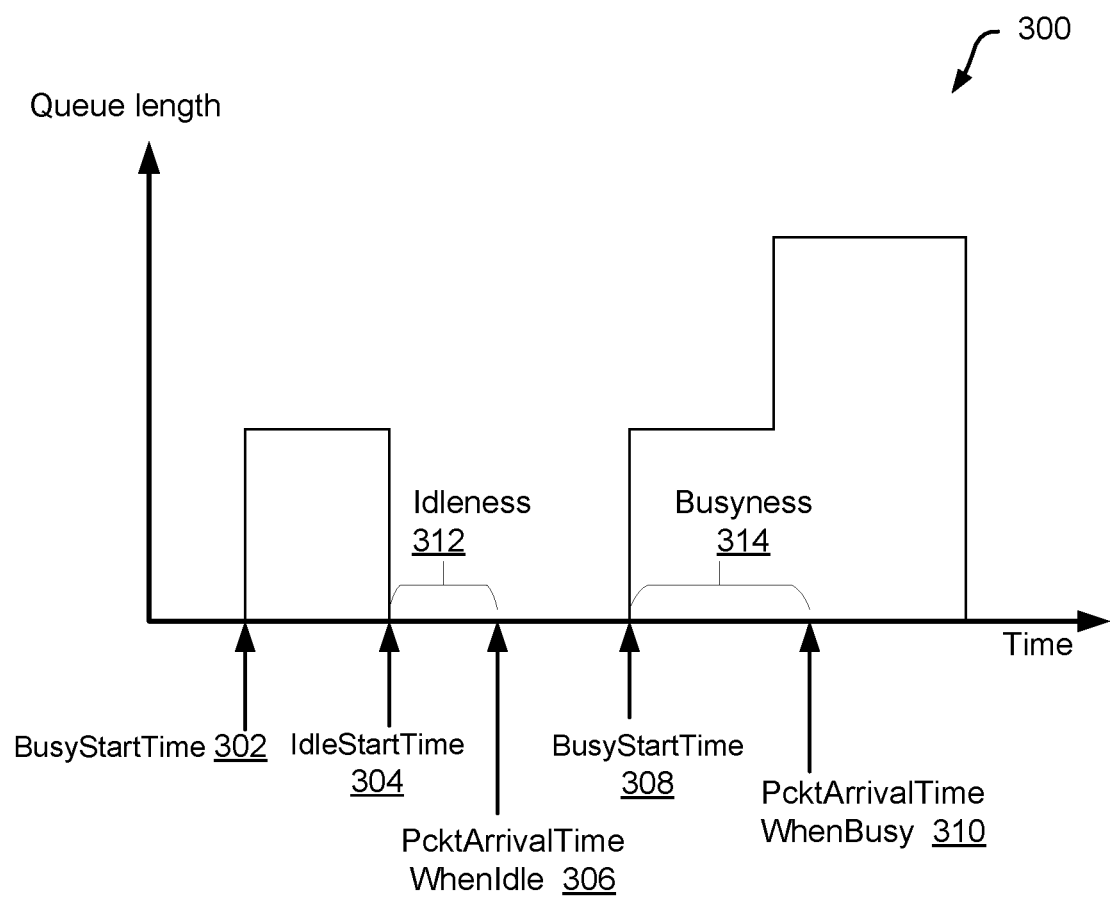
FIG. 3 illustrates the calculation of line busyness and line idleness by a switch, according to one aspect of the present disclosure.

FIG. 3 illustrates 300 the calculation of line busyness and line idleness by a switch, according to one aspect of the present disclosure. This calculation may be done using the formulas which were used in method 200.

A packet may arrive at the switch at packet arrival time when idle 306. As above, this value of packet arrival time when idle 306 may be set based on an egress time stamp on the arriving packet. The packet may arrive at a time when the switch is idle, as there is nothing in its queue. Because the queue is empty, the line busyness may be calculated as the length of the previous busy period, by taking the difference between idle start time 304 and busy start time 302. When the packet arrives, the switch may also calculate a line idleness ($\delta$) 312 based on the difference between packet arrival time when idle 306 and idle start time 304. The line idleness 312 value may be calculated as the length of the current idle period, between the time it received the packet and the time it last had a queue.

Another packet may arrive at the switch at packet arrival time when busy 310. As above, this value of packet arrival time when busy 310 may be set based on an egress time stamp on the arriving packet. The packet may arrive at a time when the switch is busy, while there are one or more packets in its queue. Because the queue is not empty, the line busyness ($\beta$) 314 may be calculated as packet arrival time when busy 310 minus busy start time 308. Line busyness 314 may reflect the length of time which the switch has been busy for between the time it received the packet and the time in which it was last idle. When the packet arrives, the switch may also calculate line idleness, based on the difference between busy start time 308 and idle start time 304. Line idleness may reflect the length of time during which the switch was idle during its most recent idle period.

The switch may be configured to calculate some or all of these values for each packet it receives. As described in method 200, the switch may update its BusyStartTime and/or IdleStartTime values for each received packet, regardless of whether the packet requests temporal congestion signals. If the switch receives a request for temporal congestion signals, it may then include the line idleness and line busyness values in a packet, such as including these values in an INT header of the packet. The request for temporal congestion signals may be inferred from the presence of an INT header in the packet.

This method 200 generally requires a switch itself to calculate the line idleness and line busyness values, and to pass these values along to the host or source node. These temporal congestion signals may be used as an alternative to or in addition to spatial congestion signals, such as queue length, queueing delay, and link utilization. The switch may be configured to calculate these values at line rate, so as to not slow down the transmission of packets. In another aspect, the switch may delegate some of this processing to the requesting device, such as a host or source node.

Figure 4:
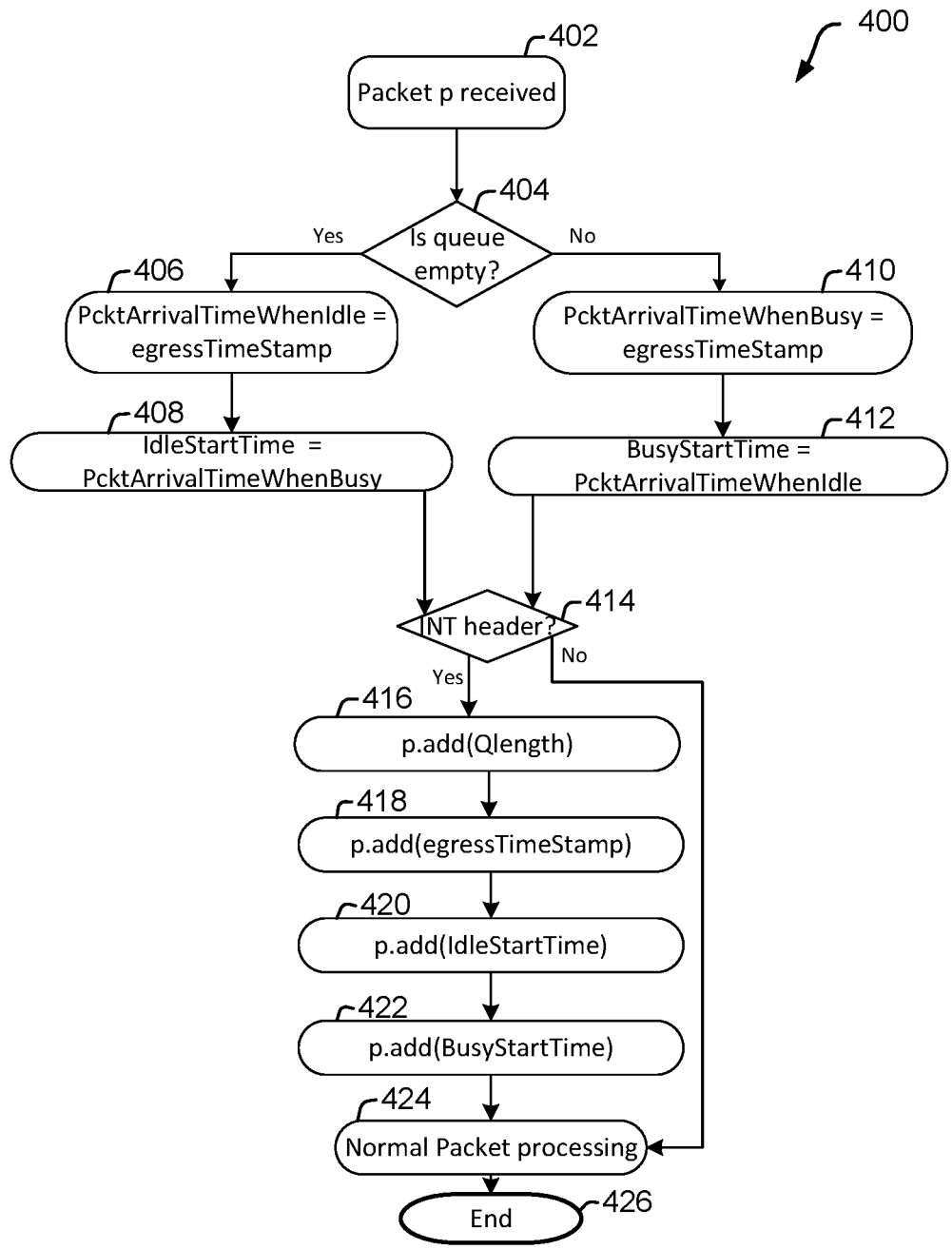
FIG. 4 is a flowchart of a method to delegate part of calculating line busyness and line idleness to hosts, according to one aspect of the present disclosure.

FIG. 4 is a flowchart of a method 400 to delegate part of calculating line busyness and line idleness to hosts, according to one aspect of the present disclosure. In this method 400, the switch may provide a host with enough information to calculate line idleness and line busyness rather than directly calculating these values. This may allow a switch to operate more quickly and may require use less resources for the switch. This method 400 may effectively offload some processing from the switch to the host or source node, allowing more efficient operation of the switch and requiring fewer resources on the switch.

At block 402, the switch receives a packet and at block 404, the switch checks whether its queue is empty.

If the switch has an empty queue, the switch proceeds to block 406, where it sets a packet arrival time when idle (PcktArrivalTimeWhenIdle) to be equal to the egress time stamp (egressTimeStamp) on the received packet. The packet arrival time when idle value may be used in future iterations of the method 400 at block 412.

Next, at block 408, the switch sets a start time of an idle period of the device (IdleStartTime) value to be equal to a packet arrival time when busy (PcktArrivalTimeWhenBusy) value. The packet arrival time when busy value may have been set in a prior iteration of the method 400 at block 410.

If the switch does not have an empty queue, at block 410, it sets a packet arrival time when busy (PcktArrivalTimeWhenBusy) to be equal to the egress time stamp (egress- TimeStamp) on the received packet. The packet arrival time when busy value may be used in a future iteration of the method 400 at block 408.

Next, at block 412, the switch sets a start time of a busy period of the device (BusyStartTime) to be equal to a packet arrival time when idle value (PcktArrivalTimeWhenIdle). The packet arrival time when idle value may have been set in a prior iteration of the method 400 at block 406.

Next, at block 414, the switch checks whether there is an INT header on the received packet. The inclusion of an INT header on the packet may constitute a request from the sending device for temporal congestion signals, such as information sufficient to calculate line busyness and line idleness. If the packet does not have an INT header, the switch proceeds to block 424 and the packet is processed normally.

If the packet has an INT header, the switch may be configured to add information to the INT header of the packet. This information may collectively be enough to calculate the line idleness and line busyness values described above. At blocks 416, 418, 420, and 422, the switch includes information sufficient to calculate line idleness and line busyness values, including the queue length (Qlength), an egress time stamp (egressTimeStamp), and the idle start time value and busy start time values. Each of the idle start time and the busy start time may be transmitted as a time stamp. The host may be configured to use these time stamps to determine one or more or line idleness and line busyness.

After adding this information to the packet, the switch then proceeds to block 424 and the packet is processed normally before the method 400 ends 426. The method 400 allows another device, such as the device which transmitted the packet, to calculate the line idleness and line busyness values. These values may be calculated in the same manner as in the prior method 200, selecting which formulas to use for line idleness and line busyness based on the queue length.

Figure 5:
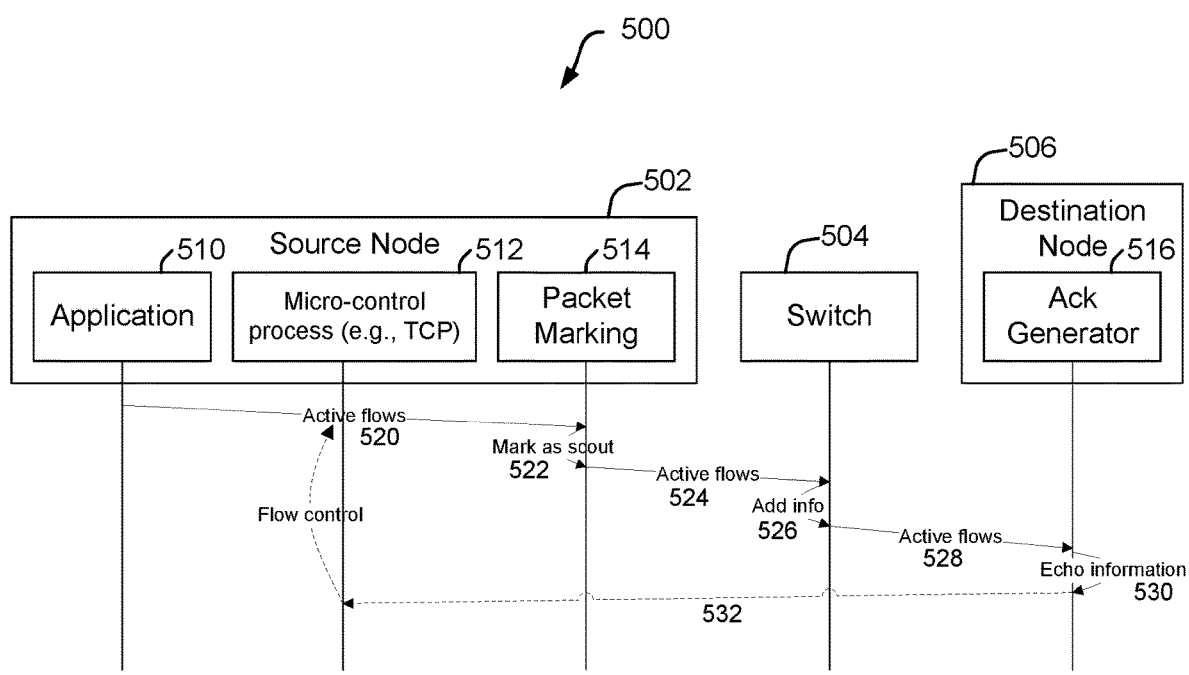
FIG. 5 illustrates a packet passing between devices in a network, according to one aspect of the present disclosure.

FIG. 5 illustrates 500 a packet passing between devices in a network, according to one aspect of the present disclosure. Here, a packet is being transmitted from source node 502 to destination node 506 passing through switch 504 on the way. Prior to transmitting the packet, the source node 502 may mark the packet 522 as a scout packet. The packet may be generated 520 by an application 510 on the source node 502, and then may be marked 522 by a packet marking module 514 which may be part of the source node 502. The packet may be marked by including an INT header on the packet. This marking may inform other devices that the source node 502 is requesting temporal congestion signals related to the packet.

The packet may then be transmitted 524 to the switch 504, which may then add information 526 to the packet. For example, the switch 504 may add temporal congestion signals to the packet, such as adding these signals to an INT header in the packet. The temporal congestion signals may be line idleness and line busyness signals, or may be information sufficient to calculate line idleness and line busyness signals, as described.

The switch 504 may then transmit 528 the packet to the destination node 506. The destination node may include an acknowledgement (ACK) generator module 516, which is configured to transmit an ACK message 532 back to the source node 502. The destination node 506 may be configured to echo information 530 back to the source node 502 in the ACK message 532. For example, this information may include temporal congestion signals which are contained in an INT header of the packet, and they may be transmitted back to the source node 502.

As illustrated, hosts, such as source node 502, may trigger the generation of a line busyness or line idleness signal by marking a packet which is transmitted to the switch 504. The host may be configured to periodically request such information, such as requesting information on a certain schedule. The host may also be configured to use these temporal congestion signals to improve link efficiency, such as achieving close to maximum link capacity while minimizing queue length at the switch.

Figure 6:
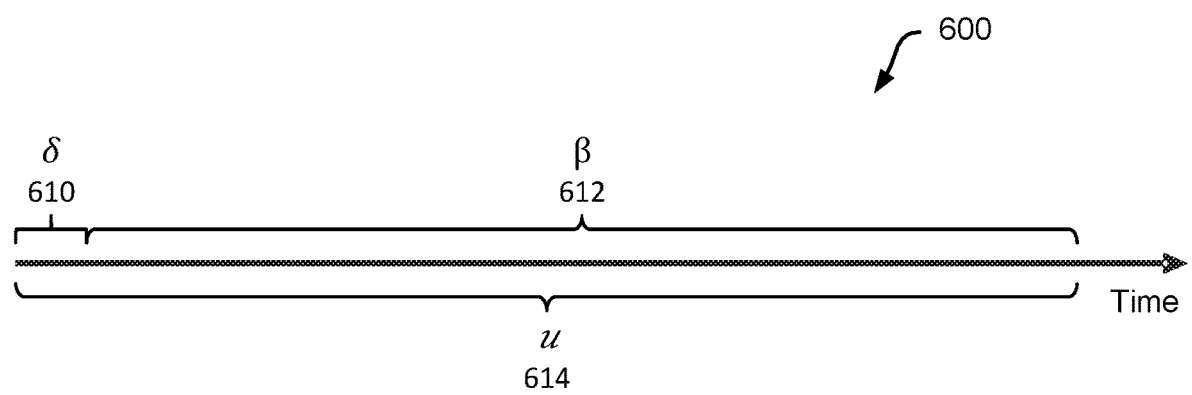
FIG. 6 illustrates a relationship between line idleness, line busyness, and link utilization, according to one aspects of the present disclosure.

FIG. 6 illustrates 600 a relationship between line idleness, line busyness, and link utilization, according to one aspects of the present disclosure. Generally, link utilization (u) 614 may be calculated based on line idleness ($\delta$) 610 and line busyness ($\beta$) 612. For example, link utilization 614 may represent a percentage of the time that the switch is busy and may be calculated as $$u = \frac{\beta}{\beta + \delta}.$$

Similarly, a host may also be able to extract the available bandwidth using line idleness ($\delta$).

As shown in this formula, line busyness 612 may be proportional to link utilization 614. This relationship may be used by a host to limit the link capacity to a certain percentage by limiting the value of line busyness 612 to a maximum threshold, to reduce the chances of dropped packets. Similarly, line idleness 610 may be limited to a maximum threshold, to assist in efficient link utilization.

For example, line busyness 612 may be limited by a host to be a maximum of 0.95×round-trip time (RTT), so that the host may seek to limit the busy periods of the switch to be 95% of an RTT between a given source node and a given destination node. Similarly, line idleness 610 may be limited by a host to be a maximum of 0.05×RTT. A host may be configured to control flow rates and/or adjust the size of a congestion window (w) based on the line idleness 610 and line busyness 612 signals to achieve close to maximum link capacity while minimizing queue length at the switch.

Figure 7:
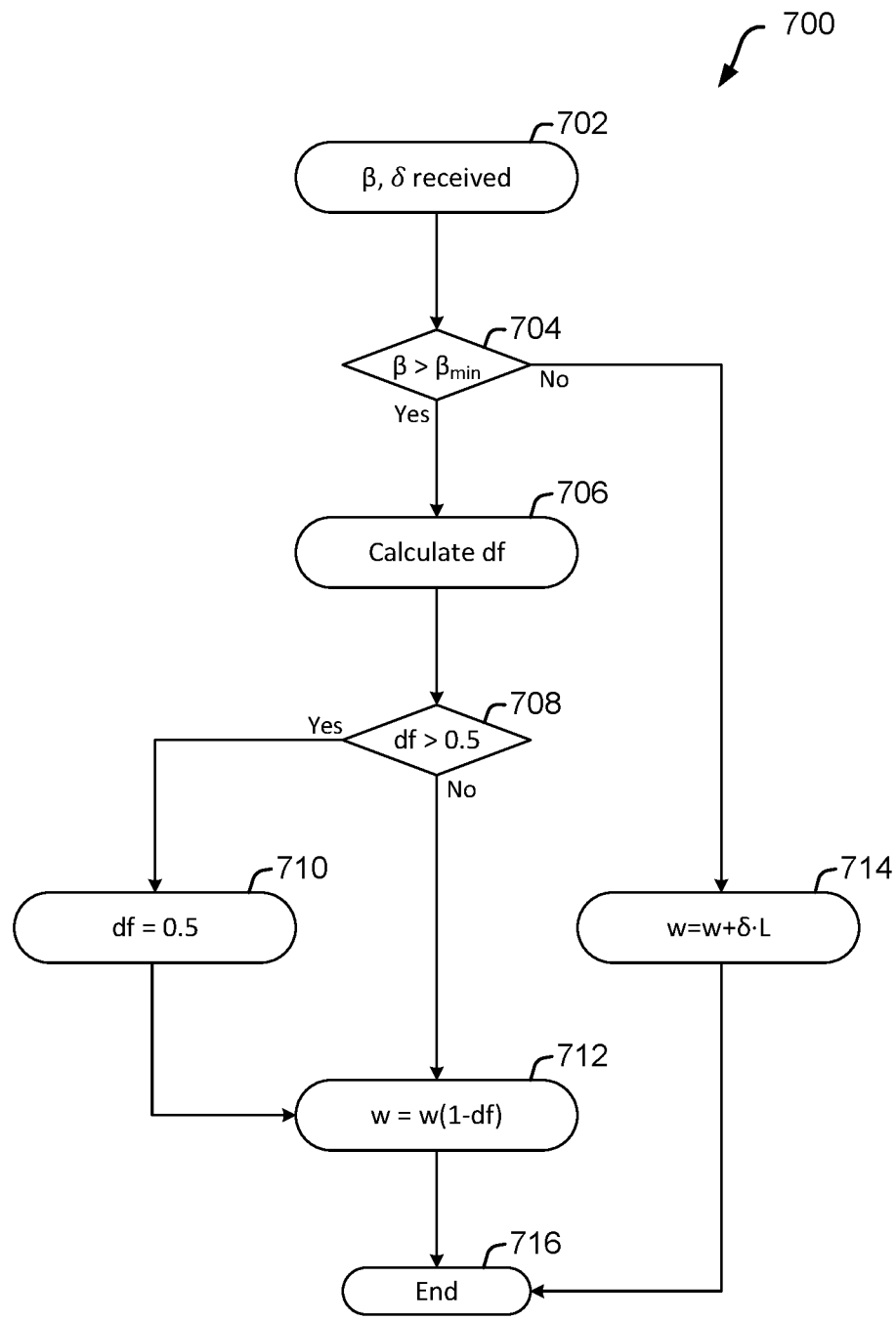
FIG. 7 illustrates a host reaction mechanism, according to one aspect of the present disclosure.

FIG. 7 illustrates a host reaction mechanism 700, according to one aspect of the present disclosure. The host reaction mechanism 700 may be used by a host to adjust the size of a control flow rate, such as a congestion window size, based on received line busyness and line idleness signals. These adjustments may reduce the likelihood of buffer overflows and dropped packets, while also seeking to ensure high link utilization. The host reaction mechanism 700 may be used by a host such as source node 502 and may be used in a micro-control module such as micro-control module 512.

The host reaction mechanism 700 may be triggered when the host receives line busyness ($\beta$) and line idleness ($\delta$) values at block 702. For example, the host may receive a packet which includes line busyness and line idleness or may receive a packet which includes information sufficient to calculate line busyness and line idleness. This process may initially be triggered by the host marking a packet, causing a switch to add line busyness and/or line idleness signals. The host may trigger this process by sampling using random distribution and/or based on a necessity to measure the network state, such as when transitioning to a congestion avoidance state in TCP. The sampling frequency used by the host may be based, at least in part, on a value of line busyness and/or line idleness. For example, the host may be configured to request temporal congestion signals more often when line busyness is high, to monitor the network state and adjust the congestion window size to prevent packet loss.

Generally, the host reaction mechanism 700 may seek to limit line idleness to be very close to zero. At the same time, the mechanism 700 may seek to guide line busyness to converge to a stable point, where $\beta > \beta_{min} >> 0$. To do this, the mechanism 700 may seek to adjust the congestion window (w) as shown in Equation 1:

$$w \leftarrow \begin{cases} w(1 - df(\beta)) & \text{if } \beta > \beta_{min} \\ w + \delta \cdot L & \text{Otherwise} \end{cases} \quad (1)$$

Where df is a decrease factor which is used to reduce the size of the congestion window when $\beta > \beta_{min}$, and where L is a packet size, such as an average packet size transmitted on the link and is used to increase the size of the congestion window when $\beta \leq \beta_{min}$. Generally, $\beta_{min}$ and $\varepsilon$ may be selected to optimize between maximum link capacity and to minimize packet loss. For example, $\beta_{min}$ may be set to be RTT, while trying to minimize 6. These values may lead to link utilization converging at a value of $$\frac{\beta_{min}}{\beta_{min} + \varepsilon},$$

or slightly less than 100% of link capacity.

At block 704, the mechanism 700 includes comparing the line busyness signal to a minimum busyness signal ($\beta_{min}$). This comparison may be used to determine whether to increase the size of the congestion window, which would also increase line busyness, or to decrease the size of the congestion window, which would also decrease line busyness.

If line busyness is not larger than the minimum busyness signal, at block 714, the mechanism 700 increases the size of the congestion window by $\delta \cdot L$, based on the line idleness ($\delta$) and the packet size (L). Increasing the size of the congestion window may increase link utilization and decrease line busyness. The mechanism 700 then ends at block 716.

If line busyness is larger than the minimum busyness signal, the mechanism 700 proceeds to block 706, where it calculates a decrease factor (df). The decrease factor may be used to reduce the size of the congestion window to decrease link utilization and reduce the chances of packet loss. The decrease factor may be set to reduce the size of the congestion window based on a difference between the line busyness and the minimum busyness signal, using a larger value when these values are far apart. For example, in one aspect, the decrease factor may be calculated as $$df = 0.5 * \left( \frac{1}{\beta_{min}} \times (\beta - \beta_{min}) \right)^3,$$

where 0.5 is a decrease factor scale, and Aran is the minimum busyness signal, which may be an RTT. This calculation of the decrease factor may reach 0.5 when the line busyness is or two RTTs. The decrease factor may also be calculated in other ways, but may generally seek to decrease the congestion window by a larger amount when line busyness is much higher than the minimum busyness value and by a smaller amount when line busyness is close to the minimum busyness At block 708, the mechanism 700 determines whether df is larger than 0.5. If df is larger than 0.5, the mechanism 700 sets df to be equal to 0.5 at block 710. The decrease factor's size may be limited to a maximum value, such as 0.5, to limit the maximum reduction of the congestion window in a single iteration of the mechanism 700.

At block 712, the mechanism 700 sets the congestion window size to be equal to w=w(1−df). In this formula, the decrease factor may be a positive value between 0 and a maximum value, such as 0.5. Accordingly, this may decrease the size of the congestion window by between 0% and 50%, depending on the value of the decrease factor. The mechanism 700 then ends at block 716.

Generally, having the switch generate temporal congestion signals and include these signals in an INT header of packets may be much more efficient than using scout packets. Using scout packets may introduce significant overhead, whereas this overhead can be significantly reduced by allowing temporal congestion signals to piggyback in the header of an existing packet. Overhead may be reduced even further when all nodes included in a data path use the same header. For example, the packet may travel through multiple nodes such as switches, and each of those nodes may include temporal congestion signals in the packet, such as line busyness and line idleness values in the packet. Alternatively, each of these nodes may selectively overwrite the line busyness and/or line idleness values in the packet. For example, each node in the data path may be configured to overwrite the line busyness and/or line idleness values in a packet if its line busyness is higher than the line busyness in the packet or if its line idleness is lower than the line idleness in the packet. This may result in a host device receiving the maximum line busyness value along a data path and receiving a minimum line idleness value in the data path. This may allow a host to set a congestion window size to avoid packet drops at the busiest node or nodes in the data path.

Figure 8:
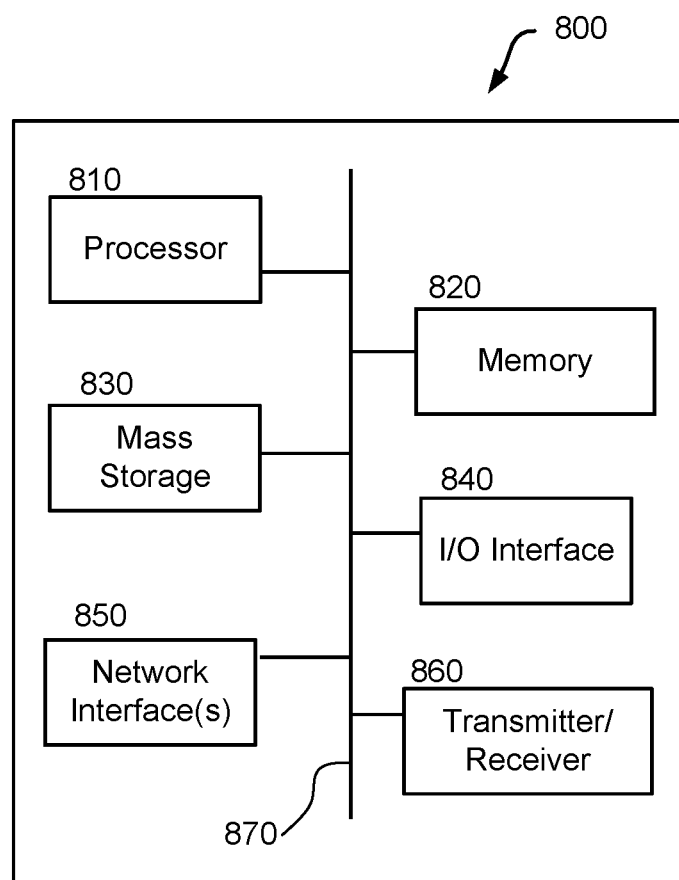
FIG. 8 is a schematic diagram of an electronic device that may perform any or all of operations of the above methods and features explicitly or implicitly described herein, according to different embodiments of the present disclosure.

FIG. 8 is a schematic diagram of an electronic device 800 that may perform any or all of operations of the above methods and features explicitly or implicitly described herein, according to different embodiments of the present disclosure. For example, a computer equipped with network function may be configured as electronic device 800. In some embodiments, the electronic device 800 may be a host, a switch, user equipment (UE), an AP, a STA or the like as appreciated by a person skilled in the art.

As shown, the electronic device 800 may include a processor 810, such as a central processing unit (CPU) or specialized processors such as a graphics processing unit (GPU) or other such processor unit, memory 820, non-transitory mass storage 830, input-output interface 840, network interface 850, and a transmitter/receiver 860, all of which are communicatively coupled via bi-directional bus 870. According to certain embodiments, any or all of the depicted elements may be utilized, or only a subset of the elements. Further, electronic device 800 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 820 may include any type of non-transitory memory such as static random-access memory (SRAM), dynamic random-access memory (DRAM), synchronous DRAM (SDRAM), read-only memory (ROM), any combination of such, or the like. The mass storage 830 may include any type of non-transitory storage device, such as a solid-state drive, hard disk drive, a magnetic disk drive, an optical disk drive, USB drive, or any computer program product configured to store data and machine executable program code. According to certain embodiments, the memory 820 or mass storage 830, which may each be referred to as a machine-readable (or computer-readable) medium (or storage), may have recorded thereon statements and instructions executable by the processor 810 for performing any of the method operations described above.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as P4 language, C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method comprising:
   receiving, at a device, a packet including a request for network state information;
   generating, at the device, one or more temporal congestion signals;
   adding, at the device, the one or more temporal congestion signals to the packet; and
   transmitting, at the device, the packet including the one or more temporal congestion signals, wherein:
   generating the one or more temporal congestion signals comprises generating at least a line busyness signal based on a duration of a busy period of the device; and
   generating the line busyness signal based on the duration of the busy period of the device comprises:
      if the device has one or more items in a queue of the device, generating the line busyness signal based on a difference between an arrival time of the packet and a start time of the busy period of the device; and
      if the device has no items in the queue of the device, generating the line busyness signal based on a difference between a start time of an idle period of the device and the start time of the busy period of the device.

2. The method of claim 1, wherein the request for network state information comprises an in-band network telemetry header on the packet.

3. The method of claim 1, wherein generating the one or more temporal congestion signals comprises generating at least a line idleness signal based on the duration of the idle period of the device.

4. The method of claim 1, wherein the one or more temporal congestion signals comprise information sufficient to calculate one or more of the line busyness signal and a line idleness signal.

5. The method of claim 4, wherein the information sufficient to calculate one or more of the line busyness signal and the line idleness signal comprises a queue length, an egress time stamp, the start time of the idle period, and the start time of the busy period.

6. The method of claim 1, wherein adding the one or more temporal congestion signals to the packet comprises adding the one or more temporal congestion signals to the packet to an in-band network telemetry header on the packet.

7. The method of claim 1, wherein the device comprises a switch.

8. A method comprising:
   receiving, at a device, a packet including a request for network state information;
   generating, at the device, one or more temporal congestion signals;

adding, at the device, the one or more temporal congestion signals to the packet; and transmitting, at the device, the packet including the one or more temporal congestion signals, wherein:

generating the one or more temporal congestion signals comprises generating at least a line idleness signal based on a duration of an idle period of the device; and generating the line idleness signal based on the duration of the idle period of the device comprises:

if the device has one or more items in a queue of the device, generating the line idleness signal based on a difference between a start time of a busy period of the device and a start time of the idle period of the device; and if the device has no items in the queue of the device, generating the line idleness signal based on a difference between an arrival time of the packet and the start time of the idle period of the device.

9. A method comprising:

marking, at a device, a first packet to include a request for network state information;

transmitting, at the device, the marked first packet;

receiving, at the device, a second packet including one or more temporal congestion signals; and adjusting, at the device, a control flow rate based at least in part on the one or more temporal congestion signals included in the second packet, wherein:

adjusting a control flow rate comprises adjusting a congestion window size based at least in part on the one or more temporal congestion signals included in the second packet; and the one or more temporal congestion signals includes a line busyness signal and wherein adjusting a congestion window size based at least in part on the one or more temporal congestion signals included in the second packet comprises:

calculating a decrease factor based on the line busyness signal and a minimum line busyness signal; and adjusting the congestion window size based on the decrease factor.

10. The method of claim 9, wherein the request for network state information comprises an in-band network telemetry header on the first packet.

11. The method of claim 9, wherein the second packet comprises an acknowledgement.

12. The method of claim 9, wherein the second packet includes the one or more temporal congestion signals in an in-band network telemetry header on the second packet.

13. The method of claim 9, wherein the one or more temporal congestion signals comprise a line idleness signal.

14. The method of claim 9, wherein the one or more temporal congestion signals comprise information sufficient to calculate the line busyness signal and a line idleness signal.

15. The method of claim 14, wherein the information sufficient to calculate the line busyness signal and the line idleness signal comprises a queue length, an egress time stamp, an idle start time, and a busy start time.

16. The method of claim 15, further comprising calculating the line busyness signal and the line idleness signal based on the queue length, the egress time stamp, the idle start time, and the busy start time.

17. An apparatus comprising:

at least one processor and at least one machine-readable medium storing executable instructions which when executed by the at least one processor configure the apparatus to:

receive a packet including a request for network state information;

generate one or more temporal congestion signals that include at least a line busyness signal based on a duration of a busy period of a device by:

if the device has one or more items in a queue of the device, generating the line busyness signal based on a difference between an arrival time of the packet and a start time of the busy period of the device; and if the device has no items in the queue of the device, generating the line busyness signal based on a difference between a start time of an idle period of the device and the start time of the busy period of the device;

add the one or more temporal congestion signals to the packet; and transmit the packet including the one or more temporal congestion signals.

18. The apparatus of claim 17, wherein the executable instructions, when executed by the at least one processor, configure the apparatus to generate a line idleness signal based on a duration of an idle period of the apparatus.

* * * * *